United States Patent
Raindel et al.

(10) Patent No.: US 9,256,545 B2
(45) Date of Patent: Feb. 9, 2016

(54) SHARED MEMORY ACCESS USING INDEPENDENT MEMORY MAPS

(75) Inventors: Shachar Raindel, Haifa (IL); Yishai Israel Hadas, Kiryat-Ata (IL); Mike Dubman, Raanana (IL)

(73) Assignee: MELLANOX TECHNOLOGIES LTD., Yokneam (IL)

(*) Notice: Subject to any disclaimer, the term of this patent is extended or adjusted under 35 U.S.C. 154(b) by 427 days.

(21) Appl. No.: 13/471,558

(22) Filed: May 15, 2012

(65) Prior Publication Data

US 2013/0311746 A1    Nov. 21, 2013

(51) Int. Cl.
G06F 9/26 (2006.01)
G06F 12/10 (2006.01)
G06F 12/02 (2006.01)

(52) U.S. Cl.
CPC ............ *G06F 12/10* (2013.01); *G06F 12/0292* (2013.01); *G06F 12/1081* (2013.01); *G06F 2212/1016* (2013.01); *G06F 2212/1044* (2013.01); *G06F 2212/652* (2013.01); *G06F 2212/656* (2013.01); *Y02B 60/1225* (2013.01)

(58) Field of Classification Search
CPC combination set(s) only.
See application file for complete search history.

(56) References Cited

U.S. PATENT DOCUMENTS

| | | | |
|---|---|---|---|
| 5,822,749 A | 10/1998 | Agarwal | |
| 5,845,329 A | 12/1998 | Onishi et al. | |
| 5,864,876 A | 1/1999 | Rossum et al. | |
| 5,893,166 A | 4/1999 | Frank et al. | |
| 6,070,219 A | 5/2000 | McAlpine et al. | |
| 6,321,276 B1 | 11/2001 | Forin | |
| 6,629,166 B1 | 9/2003 | Grun | |
| 6,766,467 B1 | 7/2004 | Neal et al. | |
| 6,789,143 B2 | 9/2004 | Craddock et al. | |
| 6,981,027 B1 | 12/2005 | Gallo et al. | |
| 7,171,484 B1 | 1/2007 | Krause et al. | |
| 7,263,103 B2 | 8/2007 | Kagan et al. | |
| 7,299,266 B2 | 11/2007 | Boyd et al. | |
| 7,464,198 B2 | 12/2008 | Martinez et al. | |
| 7,475,398 B2 | 1/2009 | Nunoe | |
| 7,548,999 B2 | 6/2009 | Haertel et al. | |
| 7,752,417 B2 | 7/2010 | Manczak et al. | |
| 7,809,923 B2 | 10/2010 | Hummel et al. | |
| 7,921,178 B2 * | 4/2011 | Haviv | ............. 709/212 |
| 8,001,592 B2 | 8/2011 | Hatakeyama | |
| 8,010,763 B2 | 8/2011 | Armstrong et al. | |
| 8,051,212 B2 | 11/2011 | Kagan et al. | |

(Continued)

OTHER PUBLICATIONS

Welsh et al., "Incorporating Memory Management into User-Level Network Interfaces", Department of Computer Science, Cornell University, Technical Report TR97-1620, 10 pages, Feb. 13, 1997.

(Continued)

*Primary Examiner* — Charles Rones
*Assistant Examiner* — Han Doan
(74) *Attorney, Agent, or Firm* — D.Kligler IP Services Ltd.

(57) ABSTRACT

A method includes defining a first mapping, which translates between logical addresses and physical storage locations in a memory with a first mapping unit size, for accessing the memory by a first processing unit. A second mapping is defined, which translates between the logical addresses and the physical storage locations with a second mapping unit size that is different from the first mapping unit size, for accessing the memory by a second processing unit. Data is exchanged between the first and second processing units via the memory, while accessing the memory by the first processing unit using the first mapping and by the second processing unit using the second mapping.

24 Claims, 1 Drawing Sheet

(56) References Cited

U.S. PATENT DOCUMENTS

| | | | |
|---|---|---|---|
| 8,086,765 | B2 | 12/2011 | Turner et al. |
| 8,255,475 | B2 | 8/2012 | Kagan et al. |
| 8,447,904 | B2 | 5/2013 | Riddoch |
| 2002/0152327 | A1 | 10/2002 | Kagan et al. |
| 2003/0046530 | A1 | 3/2003 | Poznanovic |
| 2004/0221128 | A1 | 11/2004 | Beecroft et al. |
| 2004/0230979 | A1 | 11/2004 | Beecroft et al. |
| 2005/0097183 | A1 | 5/2005 | Westrelin |
| 2007/0011429 | A1 | 1/2007 | Sangili et al. |
| 2007/0061492 | A1 | 3/2007 | Van Riel |
| 2007/0226450 | A1 | 9/2007 | Engbersen et al. |
| 2007/0283124 | A1* | 12/2007 | Menczak et al. .............. 711/207 |
| 2008/0098198 | A1 | 4/2008 | Kawamura et al. |
| 2010/0030975 | A1* | 2/2010 | Murray et al. ................ 711/154 |
| 2010/0077397 | A1 | 3/2010 | Ooi et al. |
| 2010/0095085 | A1 | 4/2010 | Hummel et al. |
| 2010/0217916 | A1* | 8/2010 | Gao et al. ........................ 711/6 |
| 2010/0274876 | A1 | 10/2010 | Kagan et al. |
| 2010/0332789 | A1 | 12/2010 | Sugumar et al. |
| 2011/0023027 | A1 | 1/2011 | Kegel et al. |
| 2011/0307646 | A1* | 12/2011 | Lee et al. ..................... 711/103 |
| 2013/0145085 | A1 | 6/2013 | Yu et al. |
| 2014/0164716 | A1 | 6/2014 | Glasco et al. |

OTHER PUBLICATIONS

Hummel M., "IO Memory Management Hardware Goes Mainstream", AMD Fellow, Computation Products Group, Microsoft WinHEC, 7 pages, 2006.

Solomon R., "IOV 1.1 Update and Overview", LSI Corporation, Member I/O Virtualization Workgroup, PCI-SIG, PCI Express, 45 pages, 2010.

Raindel et al., U.S. Appl. No. 13/628,075, filed Sep. 27, 2012.

Bloch et al., U.S. Appl. No. 13/628,187, filed Sep. 27, 2012.

Eran et al., U.S. Appl. No. 13/628,155, filed Sep. 27, 2012.

Kagan et al., U.S. Appl. No. 13/665,946, filed Nov. 1, 2012.

U.S. Appl. No. 13/229,772 Notice of Allowance dated Oct. 4, 2013.

Infiniband Trade Association, "InfiniBandTM Architecture Specification", vol. 1, Release 1.2.1, Nov. 2007.

"MPI: A Message-Passing Interface Standard", Version 2.2, Message Passing Interface Forum, Sep. 4, 2009.

Shah et al., "Direct Data Placement over Reliable Transports", IETF Network Working Group, RFC 5041, Oct. 2007.

Culley et al., "Marker PDU Aligned Framing for TCP Specification", IETF Network Working Group, RFC 5044, Oct. 2007.

U.S. Appl. No. 13/337,178, filed Dec. 26, 2011.

U.S. Appl. No. 13/280,457, filed Oct. 25, 2011.

U.S. Appl. No. 13/229,772, filed Sep. 12, 2011.

"Linux kernel enable the IOMMU—input/output memory management unit support", Oct. 15, 2007 http://www.cyberciti.biz/tips/howto-turn-on-linux-software-iommu-support.html.

U.S. Appl. No. 12/430,912 Official Action dated Jun. 15, 2011.

U.S. Appl. No. 12/430,912 Official Action dated Nov. 2, 2011.

Shenoy, P., "Paging and Virtual Memory", CMPSCI 377 Operating Systems, Lecture 14, 3 pages, Mar. 9, 2009.

U.S. Appl. No. 13/628,155 Office Action dated Sep. 5, 2014.

U.S. Appl. No. 13/665,946 Office Action dated Aug. 13, 2014.

U.S. Appl. No. 13/665,946 Office Action dated Jan. 28, 2015.

* cited by examiner

SHARED MEMORY ACCESS USING INDEPENDENT MEMORY MAPS

FIELD OF THE INVENTION

The present invention relates generally to computerized systems, and particularly to methods and systems for accessing shared memory.

BACKGROUND OF THE INVENTION

In various computerized systems, multiple system components access a shared memory. Various techniques for accessing shared memory are known in the art. For example, U.S. Pat. No. 7,752,417, whose disclosure is incorporated herein by reference, describes a computer system that dynamically selects a memory virtualization and corresponding virtual-to-physical address translation technique during execution of an application. Dynamically employing the selected technique may include reorganizing a memory, reorganizing a translation table, allocating a different block of memory to the application, changing a page or segment size, or moving to or from a page-based, segment-based, or function-based address translation technique.

SUMMARY OF THE INVENTION

An embodiment of the present invention that is described herein provides a method including defining a first mapping and a second mapping. The first mapping translates between logical addresses and physical storage locations in a memory with a first mapping unit size, for accessing the memory by a first processing unit. The second mapping translates between the logical addresses and the physical storage locations with a second mapping unit size that is different from the first mapping unit size, for accessing the memory by a second processing unit. Data is exchanged between the first and second processing units via the memory, while accessing the memory by the first processing unit using the first mapping and by the second processing unit using the second mapping.

In some embodiments, the first processing unit includes a host processor, the second processing unit includes processing hardware of a Network Interface Card (NIC), and exchanging the data includes communicating by the host processor over a communication network via the NIC. In an embodiment, the second mapping unit size is larger than the first mapping unit size. In another embodiment, the second mapping unit size is smaller than the first mapping unit size.

In some embodiments, defining the first mapping includes identifying a constraint of the first processing unit in accessing the memory, and defining the first mapping unit size so as to meet the constraint. Defining the first mapping may include choosing to define the first mapping unit size upon detecting that the constraint is more severe in the first processing unit than in the second processing unit. In another embodiment, defining the first mapping includes identifying a requirement of the second processing unit in accessing the memory, and defining the first mapping unit size so as to enable the second processing unit to follow the requirement.

In a disclosed embodiment, exchanging the data includes writing the data from the first processing unit to the memory using the first mapping unit size, and reading the data from the memory to the second processing unit using the second mapping unit size. In another embodiment, defining the first and second mappings includes automatically identifying a largest mapping data unit size that is usable by one of the first and second processing units, and defining the first and second mappings based on the largest mapping data unit size. Identifying the largest mapping data unit size may include identifying an available memory area in the one of the first and second processing units.

In yet another embodiment, accessing the memory includes applying the first mapping by a unit that is external to the first processing unit and is connected between the first processing unit and the memory. In still another embodiment, accessing the memory includes applying the first or the second mapping by performing a cascade of two or more address translations.

There is additionally provided, in accordance with an embodiment of the present invention, apparatus including a memory and first and second processing units. The first processing unit is configured to access the memory using a first mapping that translates between logical addresses and physical storage locations in the memory with a first mapping unit size. The second processing unit is configured to exchange data with the first processing unit via the memory, by accessing the memory using a second mapping that translates between the logical addresses and the physical storage locations with a second mapping unit size that is different from the first mapping unit size, while the first processing unit accesses the memory using the first mapping.

The present invention will be more fully understood from the following detailed description of the embodiments thereof, taken together with the drawings in which:

DETAILED DESCRIPTION OF EMBODIMENTS

Overview

Embodiments of the present invention that are described herein provide improved methods and systems for accessing a memory by multiple processing units. The embodiments described herein refer mainly to a data communication application in which a host processor exchanges data with a Network Interface Card (NIC) via a shared memory. The disclosed techniques, however, can be used in a wide variety of applications and with various types of memories and processing units such as Host Channel Adapters (HCAs), Host Bus Adapters (HBAs), Converged Network Adapters (CNAs) and storage controllers.

In some embodiments, two or more processing units exchange data with one another via a memory. The multiple processing units access the memory using respective logical-physical address mappings, which translate between logical addresses and physical storage locations in the memory.

In particular, at least two of the logical-physical address mappings differ from one another in their mapping unit size. In an example embodiment, one processing unit writes to the memory with a certain mapping unit size (i.e., with a certain granularity), and another processing unit reads the same data from the memory with a different mapping unit size (i.e., with a finer or coarser granularity).

The disclosed techniques enable multiple processing units to access the same physical memory locations, while tailoring the granularity of the address mapping scheme to the specific properties of each processing unit. In a host-NIC application, for example, the host may access the memory with a small mapping unit size so as to enable high flexibility. The NIC, on the other hand, may access the same memory space with a larger mapping unit size in order to reduce its memory and computation power requirements.

Since each processing unit may use a different logical-physical address mapping, limitations or constraints of one processing unit do not affect the memory access performance of other processing units. This decoupling property of the disclosed techniques enables considerable improvement in system flexibility and performance. Moreover, some operating systems do not natively support address mapping flexibilities that often exist in hardware, for example with regard to mapping unit size or address alignment. When using the disclosed techniques, the operating system is able to use an address mapping that matches its inflexible constraints, while allowing the hardware to operate with high flexibility and high performance.

System Description

Figure 1:
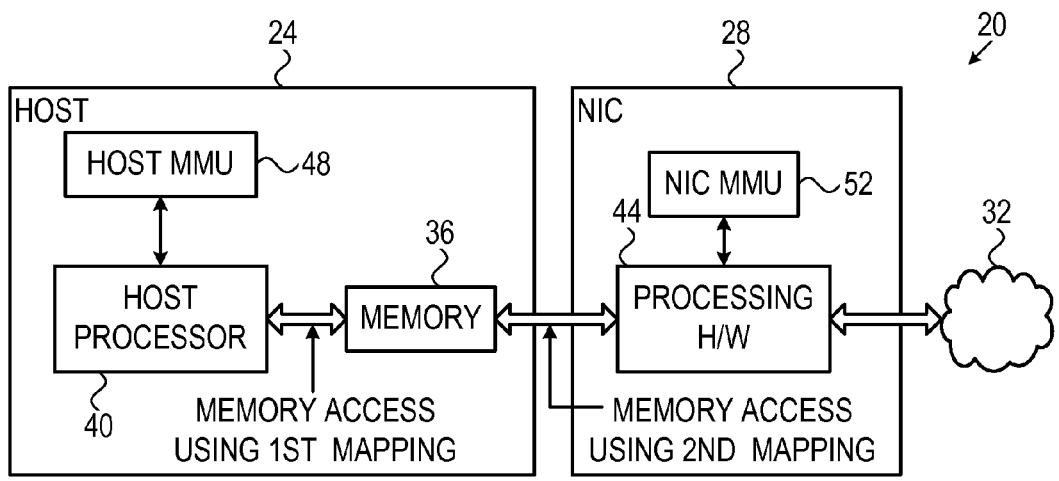
FIG. 1 is a block diagram that schematically illustrates a computerized system, in accordance with an embodiment of the present invention.

FIG. 1 is a block diagram that schematically illustrates a computerized system 20, in accordance with an embodiment of the present invention. System 20 comprises a host 24 that communicates over a communication network 32 using a Network Interface Card (NIC) 28. In alternative embodiments, the host may communicate with a storage controller. In the context of the present patent application and in the claims, the term NIC refers broadly to various kinds of network interfaces such as Host Channel Adapters (HCAs), Host Bus Adapters (HBAs) and Converged Network Adapters (CNAs), for example.

Host 24 may comprise, for example, a computer or a network element. Network 32 may comprise any suitable communication network, for example the Internet, an enterprise network, a High-Performance Computing (HPC) fabric or grid, or a Storage Area Network (SAN). Host 24 and NIC 28 may operate in accordance with any suitable communication protocol, such as Ethernet or Infiniband, for example.

In the example of FIG. 1, host 24 comprises a host processor 40 and NIC 28 comprises processing hardware (H/W) 44. The host and NIC exchange data with one another via a shared memory 36: On transmit, host processor 40 writes data to memory 36, and processing H/W 44 reads the data from the memory and transfers it to network 32. On receive, processing H/W 44 receives data from network 32 and writes the data to memory 36, and host processor 40 reads the data from the memory. (Processing functions performed by the host and NIC in accordance with the applicable communication protocol are omitted from this description for the sake of clarity.)

Host 24 comprises a host Memory Management Unit (MMU) 48, which manages the access of memory 36 by host processor 40. Similarly, NIC 28 comprises a NIC MMU 52, which manages the access of memory 36 by processing H/W 44. Amongst other tasks, each MMUs applies a respective logical-physical address mapping for accessing the memory.

Host processor 40 accesses memory 36 in accordance with the logical-physical address mapping applied by host MMU 48. The host processor typically sends memory access commands (e.g., data read and write commands) that specify logical addresses, and the host MMU translates these logical addresses into respective physical storage locations in memory 36 in which the data is read or written. In some embodiments, the functions of host processor 40 and host MMU 48 are implemented in a single chip.

Processing H/W 44 in NIC 28 accesses memory 36 in accordance with the logical-physical address mapping applied by NIC MMU 52. The NIC MMU applies logical-physical address translation, as well. The logical-physical address mapping of MMU 52, however, differs in mapping unit size (and thus in granularity) from the logical-physical address mapping applied by MMU 48. Accessing the memory with different-granularity address mappings is described in greater detail further below.

The system configuration shown in FIG. 1 is an example configuration, which is chosen purely for the sake of conceptual clarity. In alternative embodiments, any other suitable system configuration can be used. Certain elements of host 24 and NIC 28, such as host processor 40, host MMU 48, processing H/W 44 and NIC MMU 52, may be implemented using hardware, such as using one or more Application-Specific Integrated Circuits (ASICs) or Field-Programmable Gate Arrays (FPGAs). Alternatively, some system elements may be implemented in software or using a combination of hardware and software elements. Memory 36 may comprise any suitable type of memory, such as a memory that is accessible by a single entity at any given memory coupled with a memory controller that arbitrates the memory access, multiple banks of memory that may be accessible simultaneously, or dual-port Random Access Memory (RAM).

In some embodiments, certain functions of system 20, such as host processor 40 or some of the functions of MMU 48 or MMU 52, may be implemented using a general-purpose computer, which is programmed in software to carry out the functions described herein. The software may be downloaded to the computer in electronic form, over a network, for example, or it may, alternatively or additionally, be provided and/or stored on non-transitory tangible media, such as magnetic, optical, or electronic memory.

Memory Access Using Different Logical-Physical Address Mappings

In system 20, host processor 40 and processing H/W 44 both access the same physical storage locations in memory 36 in order to exchange data with one another. The capabilities, needs and constraints of processor 40 and H/W 44, however, may differ considerably with regard to memory access. For example, host processor 40 often has considerably more internal data caching space than processing H/W 44. The host processor typically also has more processing power than the NIC processing H/W.

In some embodiments, host MMU 48 and NIC MMU 52 access memory 36 using respective logical-physical address mappings that differ in mapping unit size. In an example embodiment, the mapping applied by NIC MMU 52 has a relatively large mapping unit size in comparison with the mapping unit size of the mapping applied by host MMU 48. The larger mapping unit size reduces the number of entries in the mapping, and therefore reduces the size of the data structures that need to be stored in NIC 28. Host 24, on the other hand, is typically less limited in terms of internal storage space, and therefore can use a mapping having a smaller mapping unit size.

Figure 2:
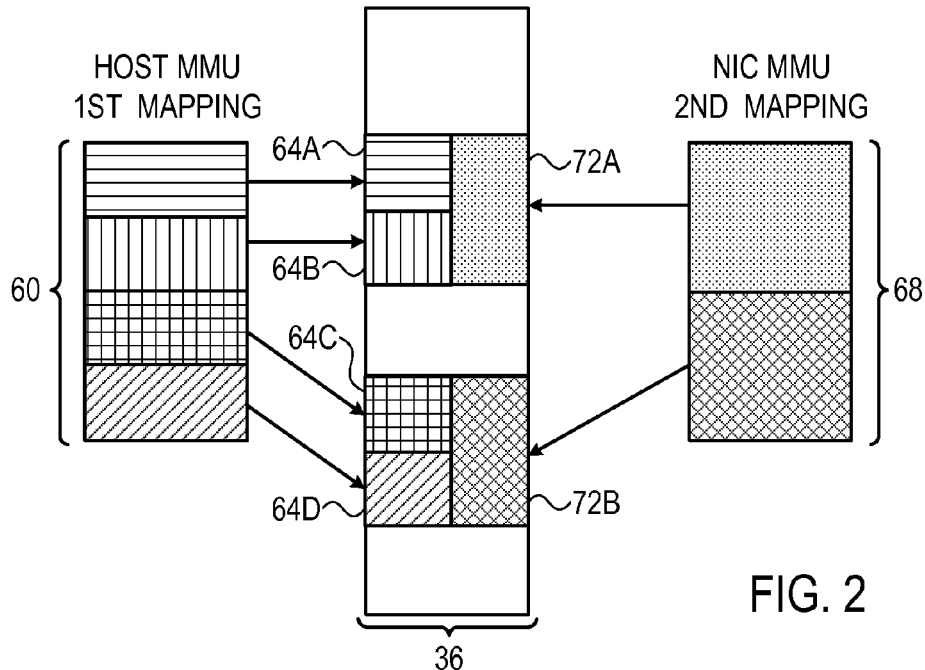
FIG. 2 is a diagram that schematically illustrates shared memory access by multiple processing units using different logical-physical address mappings, in accordance with an embodiment of the present invention.

FIG. 2 is a diagram that schematically illustrates shared access of memory 36 by host MMU 48 and NIC MMU 52, in accordance with an embodiment of the present invention. In the present example, host MMU 48 uses logical mapping units 60 whose size is 4 KB. NIC MMU 52, on the other hand, uses logical mapping units 68 whose size is 8 KB. As a result, the number of mapping units in the NIC MMU is smaller than in the host MMU, at the expense of coarser granularity.

In accordance with the logical-physical mapping of host MMU 48, the four mapping units 60 are mapped to four respective 4 KB physical storage locations in memory 36 denoted 64A . . . 64D. In accordance with the logical-physical mapping of NIC MMU 52, the two mapping units 68 are mapped to two respective 8 KB physical storage locations in memory 36 denoted 72A and 72B. Note that the host and NIC MMUs access the same physical storage locations, but with logical-physical mappings different mapping unit size.

In the example of FIG. 2, physical storage locations 64A and 64B (accessed by the host processor) span the same physical addresses as physical storage location 72A (accessed by the host processor). Similarly, physical storage locations 64C and 64D span the same physical addresses as physical storage location 72B.

In an example scenario, host processor 40 may write data to the four logical addresses 60. The data will be stored, according to the 4 KB-granularity mapping of host MMU 48, in physical storage locations 64A . . . 64D of memory 36. The NIC processing H/W can then read this data by reading two logical addresses 68, which are translated by the 8 KB-granularity of the mapping of NIC MMU 52 into physical storage locations 72A and 72B.

The example of FIG. 2 demonstrates how two different processing units may exchange data with one another via memory 36 using different mapping unit size. Using this technique, the stricter constraints of host 24 can be met by using a smaller mapping unit size, without affecting the memory access performance on NIC 28.

Figure 3:
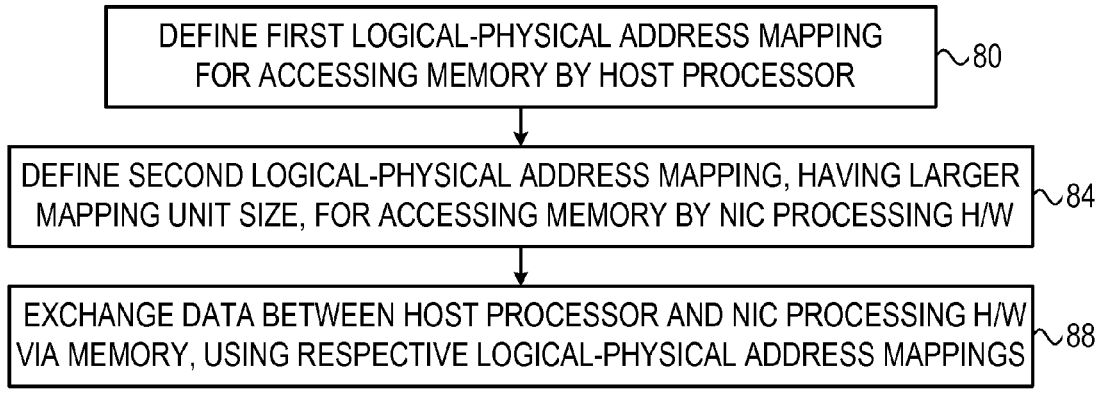
FIG. 3 is a flow chart that schematically illustrates a method for shared memory access, in accordance with an embodiment of the present invention.

FIG. 3 is a flow chart that schematically illustrates a method for shared memory access, in accordance with an embodiment of the present invention. The method begins by defining a first logical-physical address mapping for accessing memory 36 by host processor 40, at a first definition step 80. At a second definition step 84, a second logical-physical address mapping is defined for accessing memory 36 by NIC processing H/W 44. In these definitions, the first mapping has a certain mapping unit size (e.g., 4 KB) and the second mapping has a different mapping unit size (e.g., 8 KB).

Host processor 40 and processing H/W 44 exchange data with one another via memory 36, at a communication step 88. Processor 40 and H/W 44 each accesses memory 36 in accordance with its respective logical-physical address mapping. In the present example, host processor 40 sends data to NIC processing H/W 44 for transmission over network 32, and/or receives from H/W 44 data that was received over the network. In alternative embodiments, the host and NIC may exchange or use the data accessible via the memory mapping for other purposes, such as for performing CPU calculations or checksum calculation and/or verification by the NIC as part of host offloading in storage appliances.

Additional Embodiments and Variations

The embodiments described above refer mainly to two processing units—host processor 40 and processing H/W 44. In alternative embodiments, the disclosed techniques can be used with any desired number of processing units that access a shared memory. The processing units may be hardware-based, software-based, or both.

The logical-physical mappings applied by the various processing units may be defined by any of the processing units, or by an external entity. In an example embodiment related to system 20, host processor 40 defines both the mapping applied by the host processor (using MMU 48) and the mapping applied by the NIC processing H/W (using MMU 52). Typically, the mappings are defined to meet the constraint of the most constrained processing unit, H/W 44 in the present example.

In some embodiments the system (e.g., one of the processing units) identifies the processing unit having the most severe constraint related to memory access, and defines the mapping unit size of the respective mapping to meet the constraint of that unit.

For example, the system may identify a requirement or constraint of a given processing unit in accessing the memory, and define the mapping unit size for that processing unit so as to meet the requirement or constraint. As another example, the system may identify a requirement of a given processing unit in accessing the memory, and define the mapping unit size for another processing unit so as to enable the given processing unit to follow the requirement.

In some embodiments, the system automatically identifies the largest mapping unit size that can be used by each processing unit in a given area of memory 36, and defines the granularities of the various logical-physical mappings accordingly. The system may identify the largest usable mapping unit size, for example, by identifying the largest available memory area in that processing unit. In some embodiments, the logical-physical mapping for a given processing unit can be performed by a separate component that is connected between the processing unit and the memory.

In some embodiments, the logical-physical mapping for a given processing unit may comprise two or more cascaded address translations. Cascaded address translations may occur, for example, in a user process on a virtual machine when using H/W acceleration to perform the translation. Each of the cascaded translations may be performed within the processing unit or by a separate component. In some embodiments, the processing unit converts two or more cascaded address translations into a single equivalent address translation operation.

In some embodiments, the functionality of the two (or more) MMUs may be implemented in a single MMU with different mapping tables. The single MMU may be located in or coupled to the host processor, for example. This sort of configuration may be used, for example, when the hardware (e.g., NIC) supports multiple mapping unit sizes, but some of the software does not support them.

Although the embodiments described herein mainly address memory mapping for NICs, the methods and systems described herein can also be used in other applications, such as in storage controllers, machine virtualization and heterogeneous computing, amongst others.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:

defining a first mapping, which translates between specific logical addresses and respective specific physical storage locations in a memory with a first mapping unit size, for accessing the memory by a first processing unit serving as a host processor having an internal data caching space;

defining a second mapping, which translates between the specific logical addresses and the respective specific physical storage locations with a second mapping unit size that is different from the first mapping unit size, for accessing the memory by a second processing unit of a network interface card (NIC) serving the host processor, wherein the NIC has a smaller internal storage space than the host processor; and exchanging data between the first and second processing units via the memory, while accessing the memory by the first processing unit using the first mapping and by the second processing unit using the second mapping, wherein defining the first mapping comprises identifying a constraint of the second processing unit in accessing the memory, and defining the first mapping unit size so as to enable the second processing unit to follow the constraint.

2. The method according to claim 1, wherein exchanging the data comprises communicating by the host processor over a communication network via the NIC.

3. The method according to claim 2, wherein the second mapping unit size is larger than the first mapping unit size.

4. The method according to claim 2, wherein the second mapping unit size is smaller than the first mapping unit size.

5. The method according to claim 1, wherein defining the first mapping comprises identifying a constraint of the first processing unit in accessing the memory, and defining the first mapping unit size so as to meet the constraint.

6. The method according to claim 5, wherein defining the first mapping comprises choosing to define the first mapping unit size upon detecting that the constraint is stricter in the first processing unit than in the second processing unit.

7. The method according to claim 1, wherein exchanging the data comprises writing the data from the first processing unit to the memory using the first mapping unit size, and reading the data from the memory to the second processing unit using the second mapping unit size.

8. A method, comprising:

defining a first mapping, which translates between specific logical addresses and respective specific physical storage locations in a memory with a first mapping unit size, for accessing the memory by a first processing unit serving as a host processor having an internal data caching space;

defining a second mapping, which translates between the specific logical addresses and the respective specific physical storage locations with a second mapping unit size that is different from the first mapping unit size, for accessing the memory by a second processing unit of a network interface card (NIC) serving the host processor, wherein the NIC has a smaller internal storage space than the host processor; and exchanging data between the first and second processing units via the memory, while accessing the memory by the first processing unit using the first mapping and by the second processing unit using the second mapping, wherein defining the first and second mappings comprises automatically identifying a largest mapping data unit size that is usable by one of the first and second processing units, and defining the first and second mappings based on the largest mapping data unit size.

9. The method according to claim 8, wherein identifying the largest mapping data unit size comprises identifying an available memory area in the one of the first and second processing units.

10. The method according to claim 1, wherein accessing the memory comprises applying the first mapping by a memory management unit that is external to the first processing unit and is connected between the first processing unit and the memory.

11. The method according to claim 1, wherein accessing the memory comprises applying the first or the second mapping by performing a cascade of two or more address translations.

12. Apparatus, comprising:

a memory;

a first processing unit, which serves as a host processor having an internal data caching space and is configured to access the memory using a first mapping that translates between specific logical addresses and respective specific physical storage locations in the memory with a first mapping unit size; and a second processing unit of a network interface card (NIC) serving the host processor and having a smaller internal storage space than the host processor, which is configured to exchange data with the first processing unit via the memory, by accessing the memory using a second mapping that translates between the specific logical addresses and the respective specific physical storage locations with a second mapping unit size that is different from the first mapping unit size, while the first processing unit accesses the memory using the first mapping, wherein one of the processing units is configured to identify a constraint of the second processing unit in accessing the memory, and to define the first mapping unit size so as to enable the second processing unit to follow the constraint.

13. The apparatus according to claim 12, wherein, by exchanging the data, the host processor is configured to communicate over a communication network via the NIC.

14. The apparatus according to claim 13, wherein the second mapping unit size is larger than the first mapping unit size.

15. The apparatus according to claim 13, wherein the second mapping unit size is smaller than the first mapping unit size.

16. The apparatus according to claim 12, wherein one of the processing units is configured to identify a constraint of the first processing unit in accessing the memory, and to define the first mapping unit size so as to meet the constraint.

17. The apparatus according to claim 16, wherein the one of the processing units is configured to choose to define the first mapping unit size upon detecting that the constraint is stricter in the first processing unit than in the second processing unit.

18. The apparatus according to claim 12, wherein the first processing unit is configured to write the data to the memory using the first mapping unit size, and wherein the second processing unit is configured to read the data from the memory using the second mapping unit size.

19. The apparatus according to claim 12, wherein a given processing unit is configured to automatically identify a largest mapping data unit size that is usable by one of the first and second processing units, and to define the first and second mappings based on the largest mapping data unit size.

20. The apparatus according to claim 19, wherein the given processing unit is configured to identify the largest mapping data unit size by identifying an available memory area in the one of the first and second processing units.

21. The apparatus according to claim 12, and comprising a memory management unit, which is external to the first processing unit, is connected between the first processing unit and the memory, and is configured to apply the first mapping.

22. The apparatus according to claim 12, wherein the first or the second mapping comprises a cascade of two or more address translations.

23. The method according to claim 1, wherein the first mapping has a first number of mapping entries and the second mapping has a second number of mapping entries, different from the first number.

24. The method according to claim 1, wherein the first mapping has a first granularity and the second mapping has a second granularity, different from the first granularity.

* * * * *